3,623,384
Patented Nov. 30, 1971

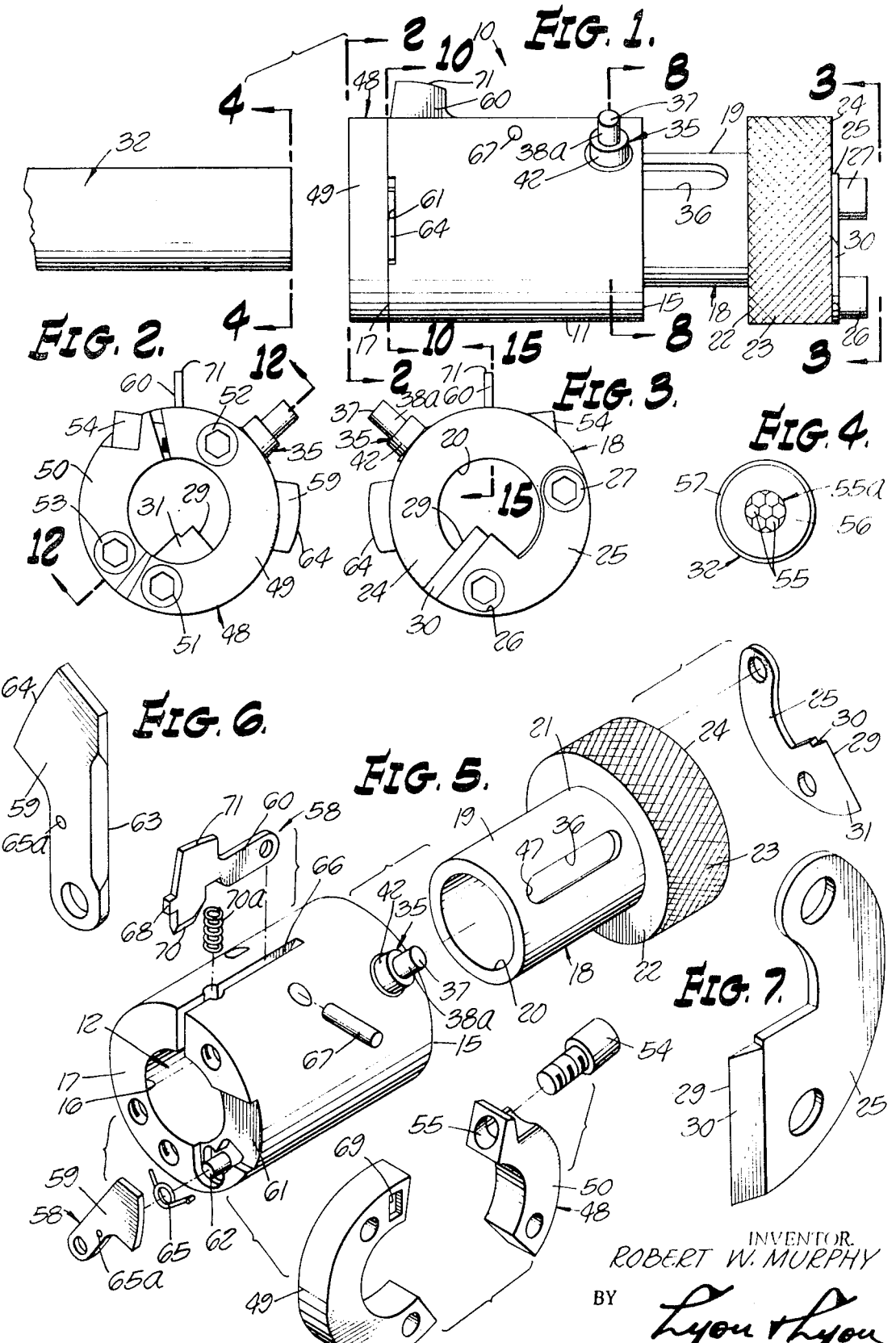

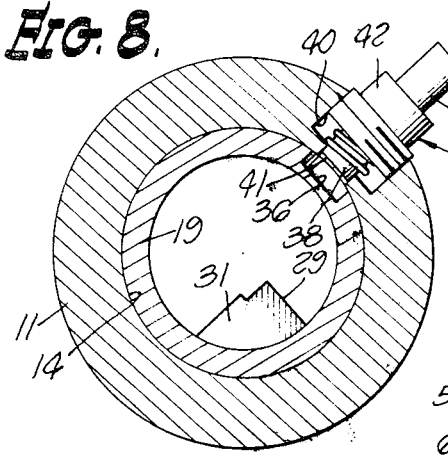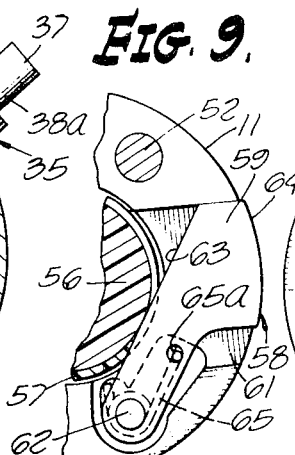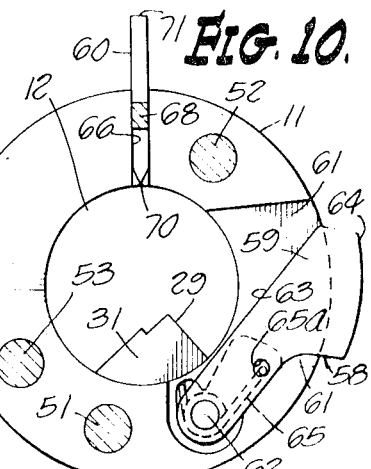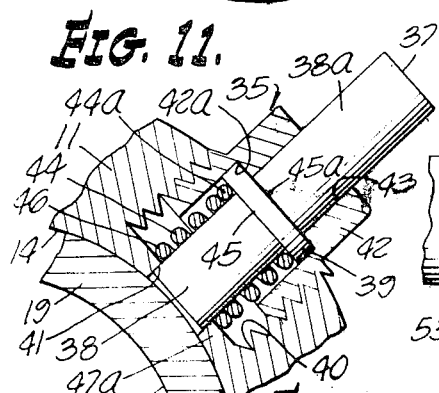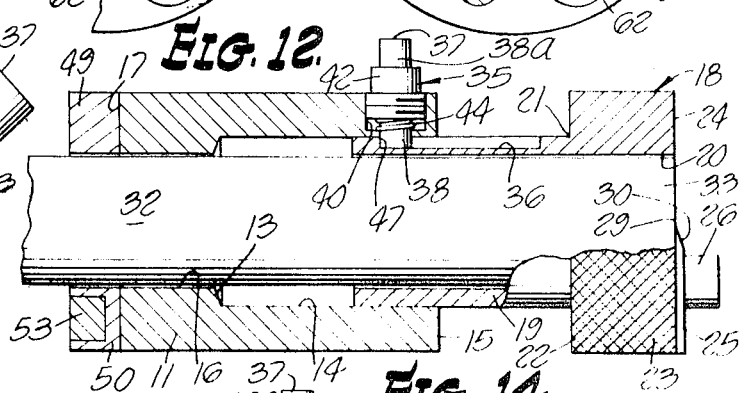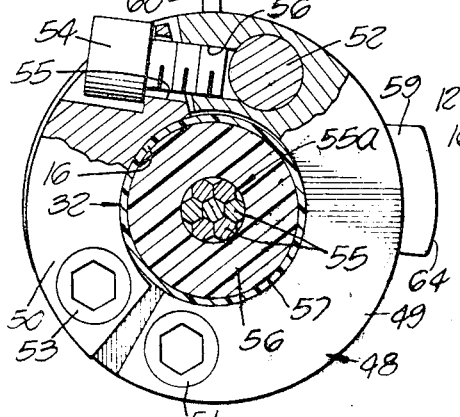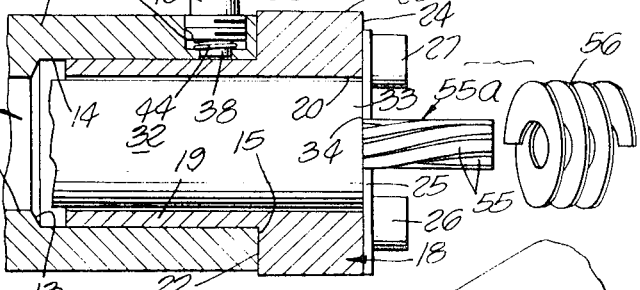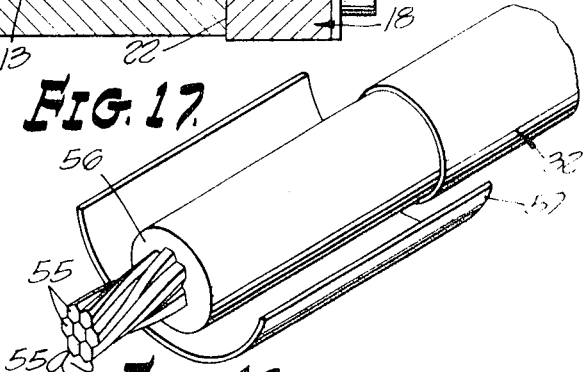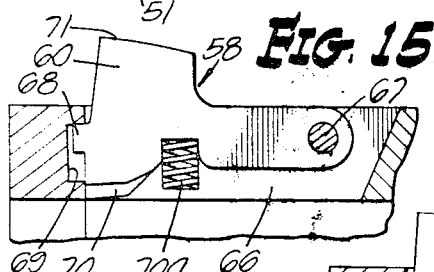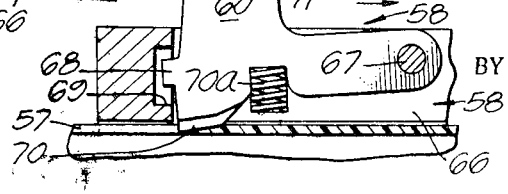

3,623,384
DEVICE FOR REMOVING CABLE INSULATION
Robert W. Murphy, 921 W. Cambridge,
Visalia, Calif. 93277
Filed Dec. 29, 1969, Ser. No. 888,779
Int. Cl. H02g 1/12
U.S. Cl. 81—9.5 R                     10 Claims

ABSTRACT OF THE DISCLOSURE

A device for removing insulating material around a conductor in an electrical cable includes a housing having a cutting member at one end. The blade of the cutting member is adapted to engage the insulating material after the housing is slid axially over the end of the cable and is further adapted to slice the insulating material when the cutting member is rotated in the proper direction. Control means are provided to limit the slicing of the blade and to determine the amount of insulating material to be removed.

---

Conductors of electricity are typically covered with one or more outer layers of an insulating material to confine the electricity carried by the conductor. The type of insulating materials and the thickness of the layers vary generally according to the amount of electrical energy being transferred through the cable formed by the conductor and insulating material.

The removal of at least a portion of the insulating material is usually necessary when connecting the conductor or otherwise securing the conductor for electrical contact. Various devices and methods have been used in the past to accomplish this sometimes difficult removal process. These devices and methods are not entirely satisfactory, particularly, in the removal of insulating material from cables transmitting great amounts of electrical energy where the layer or layers of insulating material are relatively thick and of a durable nature.

Therefore, it is a primary object of this invention to provide a device which will completely remove a predetermined lengthwise portion of the insulating material surrounding the conductor quickly and easily and without damaging or otherwise interfering with the conductor. In accordance with this object of the invention, it is desirable that the device be portable and compact for use under field conditions.

To accomplish these and other objects, the device includes a housing which is adapted to slide axially over the end of a cable and at one end of the housing is a cutting member. The backside of the blade of the cutting member is adapted to abut the insulating material when the housing is slid over the cable and the cutting edge of the blade is adapted to slice spirally into the insulating material when the cutting member is rotated in the proper direction. Limit means are provided to properly limit the slicing of the blade and prevent damage to the conductor and to accurately determine the amount of insulating material to be removed. A further cutting member may be provided to first remove any outer protective layers of material surrounding the cable.

A still further object of this invention is to provide a device which is simple in operation and which can be operated by an unskilled workman.

Other and further objects and advantages of this invention will be made readily apparent from the accompanying drawings and following detailed description.

In the drawings:

FIG. 1 is a side view of the device and a cable illustrating the telescoping of the cutting member.

FIG. 2 is an end view of the device taken on the lines 2—2 of FIG. 1 illustrating the end of the housing which first slides axially over the end of the cable.

FIG. 3 is an end view of the device taken on the lines 3—3 of FIG. 1 illustrating the blade secured to the cutting member.

FIG. 4 is an end view of the cable taken on the lines 4—4 of FIG. 1 illustrating the layers of insulating material and the conductor.

FIG. 5 is an exploded perspective view illustrating the various components of the device.

FIG. 6 is a perspective view of a blade used to remove an outer layer of material.

FIG. 7 is a perspective view of the blade of the cutting member illustrating the cutting edge.

FIG. 8 is a cross-sectional view of the device taken on the lines 8—8 of FIG. 1.

FIG. 9 is a partial sectional view of the device illustrating the use of the blade in FIG. 6.

FIG. 10 is an end view taken on the lines 10—10 of FIG. 1.

FIG. 11 is an enlarged partial sectional view of the device illustrating a component of the control means.

FIG. 12 is a cross-sectional side view of the device taken on the lines 12—12 of FIG. 2.

FIG. 13 is an enlarged end view of the device partially broken away of the end of the housing first slid over the cable.

FIG. 14 is a side view in section of the device illustrating the sliced portion of insulating material after it has been removed from the conductor.

FIG. 15 is an enlarged partial sectional view of the device illustrating a blade used to remove an outer layer of material.

FIG. 16 is an enlarged partial sectional view illustrating the blade of FIG. 15 in a cutting position.

FIG. 17 is a perspective view of the cable showing a portion where the inner and outer layers of insulating material have been removed from around the conductor and also showing a portion of the outer layer of insulating material alone cut away from the cable.

Referring now in detail to the drawings, the device, generally designated 10, includes an outer housing member 11. The housing 11 is cylindrical and includes a longitudinal central bore 12 which extends the length of the housing 11. As best seen in FIGS. 12 and 13, the bore 12 is enlarged at 13 and the enlarged portion 14 extends from 13 to one end of the housing 11, conveniently designated the rear end 15 of the housing. The non-enlarged portion 16 of the bore 12 extends from 13 to the other end of the housing 11 and is conveniently designated the forward end 17.

A cutting member 18 located generally at the rear end 15 of the housing 11 includes a cylindrical sleeve portion 19 and a central bore 20 which extends the length of the cutting member 18. The diameter of the bore 20 is equal to the non-enlarged portion 16 of the bore 12 of the housing 11 and the outer diameter of the sleeve is approximately equal to the diameter of the enlarged portion 14 of the bore 12. The sleeve 19 terminates at 21 and the cutting member 18 is increased in diameter at that point to form an abutment 22 which is at right angles to the axis of the bore 20 and a grip portion 23 which extends parallel to the sleeve portion 19 to the rear end 24 of the cutting member 18. The sleeve portion 19 fits telescopically within the housing 11 and is adapted to slide axially in the enlarged portion 14 of the bore 12 with the outer surface of the sleeve portion 19 slidably contacting the surface of the enlarged portion 14. Moreover, as shown in FIG. 14, abutment 22 is adapted to abut the end 15 of the housing 11 to limit the inward axial movement of the cutting member 18 within the housing 11.

Secured to the rear end 24 of the cutting member 18 is a blade 25. The blade 25 is secured to the rear end 24 by nuts 26 and 27 and is positioned adjacent the opening of the bore 20 with the cutting edge 29 of the blade 25 extending radially a predetermined distance into the opening of the bore 20. The blade 25 is bevelled at 30 outwardly from the bore opening and the backside 31 of the blade adjacent the cutting edge is recessed for purposes to be explained later in detail.

As seen best in FIG. 12, the housing 11 together with the cutting member 18 is adapted to slide axially over the end of the cable 32 with the cable extending through the bore 12 of the housing and the bore 20 of the cutting member. The end of the cable 32 abuts the backside 31 of the blade 25 with the cutting edge 29 adapted to engage only the insulating material 33 of the cable 32.

After the device 10 has been slid axially over the end of the cable 32 and with the end of the cable abutting the backside 31 of the blade 25, the housing 11 is slid further along the cable 32 and then stopped at a predetermined point 34 on the cable 32. Where the housing 11 stops is determined by limit means, generally designated 35.

As shown in FIGS. 8, 11 and 12, the limit means 35 includes a guide slot 36 on the outer surface of the sleeve 19 and a releasable guide member 37 mounted on the housing 11 near the end 15 which is adapted to project into the guide slot 36. The guide member 37 is comprised of a lower cylindrical portion 38 and an upper cylindrical portion 38a with a flange 39 mounted axially on the guide member 37 between the upper and lower cylindrical portions 38 and 38a. The lower cylindrical portion 38 is positioned partially within an internally threaded bore 40 in the housing 11 and extends from the bore 40 into an opening 41 which extends between the bore 40 and the bore 12. A cap member 42 is screw threaded into the bore 40 and is provided with a central opening 43 through which the upper cylindrical portion 38a extends. The underside of the cap member 42 is relieved to form a cup-like member 42a adapted to receive the flange 39. A spring 44 in the bore 40 is mounted axially on the lower cylindrical portion 38. One end 44a of the spring 44 acts on the underside 45 of the flange 39 causing the upperside 46 of the flange to be held in the cup-like member 42a. The other end 46 of the spring 44 acts on the collar 47a formed by the termination of the bore 40. The spring 44, thus normally holds the lower cylindrical portion 38 free of the bore 12. However, when a downward external force is applied to the upper cylindrical portion 38a to collapse the spring 44, the lower cylindrical portion 38 extends downward into the bore and into the guide slot 36 when it is so positioned to receive the guide member 37, as shown in FIGS. 8 and 12. It is evident that when the guide member 37 is pushed into the guide slot and the housing 11 is slid axially along the cable 32, the guide member will eventually contact the end 47 of the guide slot 36 to prevent further axial movement of the housing 11 in the direction away from the end of the cable 32 and this establishes the desired position of the housing 11 on the cable 32.

Locking means, generally designated 48, mounted on the forward end 17 of the housing 11 are provided to hold the housing 11 in this position and prevent any further rotation of the housing 11 on the cable 32. The locking means 48, as seen best in FIGS. 2, 5, and 13, includes a pair of operably connected clamp members 49 and 50. Clamp member 49 is adjacent to and partially encircles one side of the opening into the bore 12 at the forward end of the housing 11 and is secured to the housing 11 by screws 51 and 52. Clamp member 50 is also adjacent to and partially encircles the other side of the opening into the bore 12 and is secured to the housing 11 by a screw 53. A lock screw 54 which extends through a transverse opening 55 in the clamp member 50 and into an internally threaded transverse opening 56 in the clamp member 49 operably connects the clamp members 49 and 50. When the lock screw 54 is tightened it causes the clamp member 50 to pivot on the screw 53 towards the clamp member 49 and in turn causes the clamp member 50 to bear down on the cable 32 which extends through the opening of the bore 12 at forward end 17 of the housing 11. Subsequent tightening of the lock screw 54 causes the locking means 48 to grip the cable 32 and thus holds the housing 11 in the desired position.

It should be noted that the device 10 as shown in the drawings is adapted for use with a cable of the type shown in FIG. 17. However, it is evident that the device 10 could be easily modified without deviating from the scope of the invention to accommodate almost any type of cable with insulating material surrounding the internal conductor. The particular cable shown in FIG. 17 is the type generally used to transmit a relatively high amount of electrical energy and is comprised of a plurality of wires 55 which comprise the conductor 55a and the wires 55 are surrounded by a first layer of insulating material 56 which in turn is surrounded by a second layer of insulating material or covering 57. In the cable shown the first layer of insulating material 56 is comprised of a durable plastic or the like and is substantially thicker than the second layer of insulating material 57 which is also in this instance a plastic or the like material. When removing the layers of insulating material from cables of this type it is sometimes desirable to remove a greater portion of the outer layer or second layer of insulating material. Therefore, the invention, as shown in the drawings, is provided with a second cutting means, generally designated 58 and as shown best in FIGS. 5, 6, 9, 10, 15 and 16, which is adapted to removing only the second layer of insulating material 57.

The second cutting means 58 includes a pair of blade members 59 and 60. Blade member 59 is spring mounted to the forward end 17 of the housing 11 between the housing 11 and the locking means 48. The blade 59 is positioned in a recessed portion 61 and is pivotally attached at one end to pivot member 62 which extends parallel to the axis of the bore 12. The blade member 59 includes a cutting edge 63 which is located adjacent to the opening into the bore 12 at the forward end of the housing 17 and as seen in FIG. 9, the cutting edge 63 is adapted to be moved into the bore 12 and against the cable 32 when pressure is applied to the blade along the edge 64 which extends radially beyond the outer surface of the housing 11. As seen in FIG. 10, a torsion spring 65 engages the blade 59 at 65a to normally maintain the blade 59 and cutting edge 63 free from bore 12 and the cable 32. When the cutting edge 63 is pressed down on the cable and the housing 11 is rotated the blade 59 cuts a circumferential groove into the second layer of insulating material 57.

The blade member 60 is positioned within a longitudinal slot 66 in the housing 11 and is pivotally connected at one end to a pivot rod 67 which extends transversely across the slot 66. The other end of the blade 60 is provided with a flange 68 which extends into a cavity or slot 69 in the clamp member 49. As seen in FIGS. 15 and 16, the flange limits the vertical movement of the blade member 60 and maintains the blade member 60 in the longitudinal slot 66. The blade 60 also includes a cutting edge 70 which is normally maintained by a spring 71 out of the bore 12 and clear of cable 32, however, when external pressure is applied to the edge 71, which extends beyond the housing 11, the cutting edge 71 extends into the bore 12 as seen in FIG. 16 and against the cable 32 positioned in the bore 12. Thus, when the cutting edge is pushed against the cable 32 and the housing 11 is slid axially along the cable the blade 60 will cut a longitudinal groove parallel to the axis of the cable into the second layer of insulating material 57.

In operation the device 10 is first slid axially over the end of the cable 32 until the back side 31 of the blade 25 abuts the end of the cable 32. The guide member 37 is then aligned with the guide slot 36 and with the lower cylindrical portion 38 extending into the guide slot 36 the housing 11 is slid axially along the cable 32 until the guide member 37 contacts the end 47 of the guide slot 36. With the housing 11 at this position on the cable 32, the blade 59 is then pressed firmly down against the cable 32 and the housing 11 is twisted one complete rotation to cut a circumferential groove into the second layer 57. Next the lock screw 54 is tightened to cause the clamp member 50 to press down firmly on the cable 32 and thereby lock the housing 11 at this location on the cable against any further axial or rotational movement.

The cutting member 18 is then rotated to cause the blade 25 to slice radially into the insulating material at the end of the cable 32. Upon further rotation of the cutting member 18, the recessed portion of the back side 31 of the blade 25 causes the blade 25 to slice spirally into the insulating material, and the cutting member 18 move axially along the cable 32 toward the rear end 15 of the housing 11. The cutting member 18 is then rotated until the abutment 22 contacts the end 15 of the housing 11. The predetermined amount of sliced portion of the insulating material is then pulled from the conductor.

Lock screw 54 is loosened after the sliced insulating material has been removed and with the blade 60 pressed firmly against the cable 32, housing 11 is slid axially off the cable 32 causing a longitudinal groove to be cut into the outer layer or second layer of insulating material 57. After the device 10 has been removed from the cable 32, the portion of the second layer of insulating material 57 which has been cut both circumferentially and axially is then removed to complete the insulation removal process.

This invention provides a portable and compact device to remove insulating material surrounding the conductor of an electrical cable in a quick and efficient manner. The invention is particularly desirable when removing a layer or layers of insulating material which are relatively thick and of a durable nature. The device also is adapted to remove only the exact and desired amount of insulating material without interfering or damaging the conductor. The device is also adapted to remove only the outer layer of insulating material and the entire process of removing the insulating material can be accomplished by an unskilled workman.

I claim:

1. A device for removing insulating material in a cable surrounding a conductor, comprising: a housing having a bore therethrough and adapted to be slid axially over the end of the cable; a cutting member operably connected to said housing and having a blade secured thereon adjacent said bore; said blade having one side beveled outwardly from said bore to form a sharp cutting edge, said other side of said blade being adapted to abut only the insulating material of the cable when said housing is slid axially over the end of the cable and having a recessed portion adjacent said cutting edge to cause said blade to slice spirally and radially into the insulating material when said cutting member is rotated in one direction whereby the sliced insulating material is removable from the conductor.

2. The device of claim 1, wherein said cutting member is telescopically positioned within said housing for rotational and axial movement, said cutting member and said housing adapted to move axially a predetermined distance apart when said blade is abutting the end of the cable, means to limit the axial distance said housing and said cutting member are moved apart, and means to lock said housing on said cable after said housing and said cutting member are moved apart whereby when said cutting member is rotated to slice the insulating material said cutting member moves axially towards said housing until said housing and said cutting member are together so that only a predetermined lengthwise portion of the insulating material is sliced.

3. A device for removing insulating material in a cable surrounding a conductor, comprising: a housing having a bore therethrough and adapted to be slid axially over the end of the cable; a cutting member operably connected to said housing and having a blade secured thereon adjacent said bore; said cutting member being telescopically positioned within said housing for rotational and axial movement, said blade being adapted to abut only the insulating material of the cable when said housing is slid axially over the end of the cable, said cutting member and said housing adapted to move axially a predetermined distance apart when said blade is abutting the end of the cable, means to limit the axial distance of said housing and said cutting member are moved apart, said limit means comprising a longitudinal guide slot and a releasable guide member, said guide member adapted to be pressed into said guide slot when said housing and said cutting member are moved axially apart to limit the distance said housing and said cutting member are moved apart, said blade having means to cause said blade to slice spirally and radially into the insulating material when said cutting member is rotated in one direction whereby the sliced insulating material is removable from the conductor, and means to lock said housing on said cable after said housing and said cutting member are moved apart whereby when said cutting member is rotated to slice the insulating material said cutting member moves axially toward said housing and said cutting member are together so that only a predetermined lengthwise portion of the insulating material is sliced.

4. The device of claim 3, wherein said guide member is spring mounted on said housing and said guide slot is located on said cutting member.

5. The device of claim 2, wherein said locking means comprises a pair of operably connected clamp members secured to said housing and encircling said bore and adjustable means to cause said clamp members to grip the cable extending through said bore.

6. The device of claim 1, wherein said cutting member is provided with circumferential grip means coaxial with said bore to grip said cutting member during rotational movement of said cutting member.

7. The device of claim 1, wherein means are provided to cut a predetermined longitudinal groove into the insulating material and a predetermined circumferential groove into the insulating material.

8. The device of claim 7, wherein said groove cutting means comprise first and second blade members, said first blade member pivotally mounted to said housing and having a cutting edge positioned perpendicular to said bore, said second blade member pivotally mounted to said housing and having a cutting edge positioned parallel to said bore, said cutting edge of said first and second cutting members each adapted to be extended against the cable extending through said bore.

9. The device of claim 1, wherein said cutting member is coaxial with said housing and movable rotationally and axially therewith, limit means to limit the axial movement of said cutting member with respect to said housing, said limit means comprising a longitudinal guide slot and a releasable guide member, said guide member adapted to be pressed into said guide slot when said housing and said cutting member are moved axially apart to limit the distance said housing and said cutting member are moved apart.

10. The device of claim 9, wherein said guide member is spring mounted on said housing and said guide slot is located on said cutting member.

References Cited

UNITED STATES PATENTS 969,339  9/1910  Chytraus _____ 30—90.6

FOREIGN PATENTS 1,057,254  2/1967  Great Britain _____ 81—9.5 C
822,126  9/1937  France _____ 81—9.5 R THERON E. CONDON, Primary Examiner
R. V. PARKER, JR., Assistant Examiner